United States Patent [19]

Dubner

[11] Patent Number: 5,077,608
[45] Date of Patent: Dec. 31, 1991

[54] VIDEO EFFECTS SYSTEM ABLE TO INTERSECT A 3-D IMAGE WITH A 2-D IMAGE

[75] Inventor: Robert J. Dubner, Westwood, N.J.

[73] Assignee: Dubner Computer Systems, Inc., Paramus, N.J.

[21] Appl. No.: 584,687

[22] Filed: Sep. 19, 1990

[51] Int. Cl.⁵ .............................................. H04N 5/262
[52] U.S. Cl. ..................................... 358/183; 358/22; 340/729; 395/119; 395/125
[58] Field of Search ................. 358/183, 182, 180, 22; 340/725, 729; 364/522

[56] References Cited

U.S. PATENT DOCUMENTS

| | | | |
|---|---|---|---|
| 3,816,726 | 6/1974 | Sutherland et al. | 340/729 |
| 4,591,897 | 5/1986 | Edelson | 358/182 |
| 4,625,289 | 11/1986 | Rockwood | 364/522 |
| 4,684,990 | 8/1987 | Oxley | 358/180 |
| 4,797,836 | 1/1989 | Witek | 340/725 |
| 4,875,097 | 10/1989 | Jackson | 358/180 |
| 4,893,260 | 1/1990 | Arakawa | 364/522 |
| 4,943,938 | 7/1990 | Aoshima et al. | 364/522 |

FOREIGN PATENT DOCUMENTS 2100956 1/1983 United Kingdom .

OTHER PUBLICATIONS

Consideration Regarding the Use of Digital Data to Separate Video Backgrounds, by Honard, 8/78.

Primary Examiner—James J. Groody
Assistant Examiner—Glenton B. Burgess
Attorney, Agent, or Firm—John Smith-Hill

[57] ABSTRACT

A video effects system comprises a graphics generator for generating a three-dimensional image in simulated real time, a digital video effects device for generating a second image and transforming the second image in real time, and a depth combiner for combining the three-dimensional image with the transformed second image to produce an output image that is the intersection of the three-dimensional image and the transformed second image.

16 Claims, 3 Drawing Sheets

VIDEO EFFECTS SYSTEM ABLE TO INTERSECT A 3-D IMAGE WITH A 2-D IMAGE

BACKGROUND OF THE INVENTION

This invention relates to a video effects system, and more particularly to a system that is able to intersect a 3-D image with a 2-D image.

Digital video effects (DVE) devices, such as the ADO manufactured by Ampex Corporation of Palo Alto, California and the Kaleidoscope manufactured by The Grass Valley Group, Inc. of Grass Valley, California, have the ability to transform a television image. A basic technique for doing this, as disclosed in U.S. Pat. No. 4,875,097 issued Oct. 17, 1989 to Richard A. Jackson entitled "Perspective Processing of a Video Signal", is to take each two-dimensional image and assign to each pixel three coordinates (X,Y,Z). The X and Y coordinates refer to the pixel's position on a flat surface, and the Z coordinate refers to the distance from a plane that contains the viewer's eye. The Z coordinate is initially set to some constant since the viewer is looking straight at a flat image.

The DVE device then does a three-dimensional transformation on the coordinates of each pixel, such as disclosed in U.S. Pat. No. 4,797,836 issued Jan. 10, 1989 to Francis A. Witek and David E. Lake, Jr. entitled "Image Orientation and Animation Using Quaternions". Such a transformation is the mathematical equivalent of taking the flat more of the three coordinate axes, and then moving in space. This transformation process takes the original X, Y and Z coordinates and maps them into a new set of coordinates X', Y' and Z'. The transformed image is then projected into the X-Y plane. Current DVE devices implement transformation algorithms using hardware and are able to work in real time, and the particular transform that is effected depends on an operator control, typically a joystick. Therefore, as the joystick is moved, the transform changes and the image can be rotated and translated.

FIG. 1 illustrates in simplified block form a digital video effects system by which two-dimensional images can be transformed and combined. The FIG. 1 device comprises sources 2A, 2B of first and second analog video signals, VideoA and VideoB respectively. Each video signal represents a two-dimensional image that is characterized by a distribution of color information over a two-dimensional display plane. The video signals are accompanied by respective key signals KeyA and KeyB, which are derived from key sources 8A, 8B and represent opacity of the respective images as a function of location over the display plane. The video signals and the accompanying key signals are applied to converters 12A, 12B, which convert the input video signals and key signals into digital form. Each converter 12 may convert its input video signal into a digital signal that is compatible with a standard digital television format, such as the CCIR.601 format.

A digital video signal in the CCIR.601 standard is composed of four-word packets. Each packet contains two luminance slots, Y, and two chrominance slots, C1, C2, multiplexed in the sequence C1 Y C2 Y. The words are up to ten bits each and the data rate is 27 million words per second. Thus, the luminance component of the video signal is digitized at 13.5 MHz and each chrominance component is digitized at half that rate. A signal in accordance with the CCIR.601 standard is informally referred to as a 4:2:2 signal.

Each converter 12 has four output channels, namely a luminance channel, two chroma channels and a key channel. The luminance channel carries luminance information in ten bit words at 13.5 MHz, the first chroma channel carries information pertaining to one of the chroma components in ten bit words at 6.75 MHz, the second chroma channel carries information pertaining to the other chroma component in ten bit words at 6.75 MHz, and the key channel carries key information in ten bit words at 13.5 MHz. The three video channels may, if necessary, be multiplexed to provide a 4:2:2 signal.

The four output channels of converter 12 are applied to a transform section 14 where the input video signal, representing color as a function of position in the display plane, is manipulated in three-dimensions to simulate transformation (translation and/or rotation of the two-dimensional image) of the image in a three-dimensional space and projection of the transformed 2-D image back into the display plane. The transformation may be effected by loading the values of Y, C1 and C2 into a frame buffer at addresses that depend on time relative to the sync signals of the input video signal and reading the values out at different times relative to the sync signals of the output video signal, whereby a quartet of values C1,Y,C2,Y is shifted to a different location in the raster. The key signal is transformed in similar manner. The nature of the transform can be selectively altered in real time by use of a joystick 15.

In the transformation operation, values of depth (Z) relative to the display plane are calculated to twenty bits.

Each transform section has six digital output channels. Three output channels carry a digital video signal VideoA' or VideoB', representing the projection of the transformed two-dimensional image into the display plane, in the same form as the digital input video signal. The fourth channel carries the transformed key signal KeyA' or KeyB' in the same form as the input key signal. The twenty-bit depth words are each divided into two ten-bit components Z1 and Z2, which are carried by the fifth and sixth channels respectively at 6.75 MHz. The key and depth channels may, if necessary, be multiplexed to provide a signal similar to a 4:2:2 video signal.

The output signals of the two transform sections 14A, 14B are input to a depth combiner 16. Combiner 16 combines the transformed video signals VideoA' and VideoB' on the basis of the respective key and depth signals and generates a combined output video signal VideoC. Combiner 16 also combines the transformed key signals KeyA' and KeyB' using well understood rules and generates a key signal KeyC, and generates a depth signal $Z_C$ whose value is equal to the smaller of $Z_A'$ and $Z_B'$. Combiner 16 includes a multiplexer that multiplexes the luminance and chroma information of signal VideoC such that the output video signal is in accordance with CCIR.601. Combiner 16 also includes a multiplexer that multiplexes the key and depth signals and provides a signal in a form similar to the CCIR.601 format, each packet containing two ten-bit words of key and one twenty-bit word of depth in two parts of ten bits each.

By selection of the transformations that are performed on the two video images, each transformed image may have pixels that map to the same X' and Y' coordinates, so that the two images intersect.

FIG. 2 illustrates in simplified form the operations performed by a graphics generator, such as the Graphics Factory manufactured by Dubner Computer Systems, Inc. of Paramus, New Jersey. The graphics generator first generates three-dimensional image data, for example by specifying a set of points in space that are to be connected. The points are connected by lines, and polygons are thereby defined. The polygons are broken down into smaller and smaller polygons, until a set of polygons is obtained such that each polygon defines a surface patch that is planar within a predetermined tolerance. In this fashion, a data base is created containing locations in a three-dimensional space (X,Y,Z) of the vertices of polygonal surface patches.

It is then necessary for the operator to define the direction from which the image is to be viewed. If the image is, for example, an ellipsoid, the viewing direction might be specified as along one of the axes of symmetry of the ellipsoid. This viewing direction is fixed relative to the image. A three-dimensional transformation is then carried out on the image data so as to displace and orient the image so that the viewing direction lies on the Z axis. This is accomplished by use of a software implementation of transformation algorithms that are similar to those used by a DVE device for rotating and moving an object in three-dimensional space. A lighting model is applied to the transformed image so as to generate, for each surface patch, a perceived color that takes account of light source, viewing direction, surface color and other factors. The image data is projected into the X-Y plane by loading the color values, which may be defined by one luminance value and two chroma values, into a frame buffer using only X and Y values to address the frame buffer. By repeatedly reading the contents of the frame buffer, a digital video signal is generated representing the image when viewed along the selected viewing direction. Also, by creating successive frames in which the image is at different locations and/or orientations relative to the Z axis, movement of the image can be simulated. However, current graphics generators are not able to operate in real time.

The Graphics Factory has two digital output channels. One channel carries the digital video signal in CCIR.601 form. The other channel carries a key signal in ten bit words at 13.5 MHz.

It will be appreciated that the foregoing description is very much simplified, but since digital video effects systems and graphics generators are known in the art additional description of their operation is believed to be unnecessary.

SUMMARY OF THE INVENTION

Although a graphics generator calculates values of Z for the transformed image, for example for use in hidden surface removal, the output signal of the graphics generator does not contain explicit depth information.

According to a first aspect of the invention, a video effects system comprises means for generating a three-dimensional image in simulated real time, means for generating a second image, transform means for transforming the second image in simulated real time, and combiner means for combining the three-dimensional image with the transformed second image to produce an output image that is the intersection of the three-dimensional image and the transformed second image.

According to a second aspect of the invention, a video effects system comprises means for generating a three-dimensional image in simulated real time, means for generating a second image in real time, transform means for transforming the second image in real time and generating depth information associated with the transformed second image, and combiner means for combining the three-dimensional image with the transformed second image on the basis of the depth information to produce an output image that is the intersection of the three-dimensional image and the transformed second image.

According to a third aspect of the invention, a method for carrying out a video effect comprises generating in simulated real time a first video signal representative of a three-dimensional image and a first depth signal associated therewith, generating in real time a second video signal representative of a two-dimensional image, transforming the second video signal in real time and generating a second depth signal, and combining the first video signal with the transformed second video signal on the basis of the first and second depth signals.

BRIEF DESCRIPTION OF THE DRAWING

For a better understanding of the invention, and to show how the same may be carried into effect, reference will now be made, by way of example, to the accompanying drawings in which.

DETAILED DESCRIPTION

Figure 1:
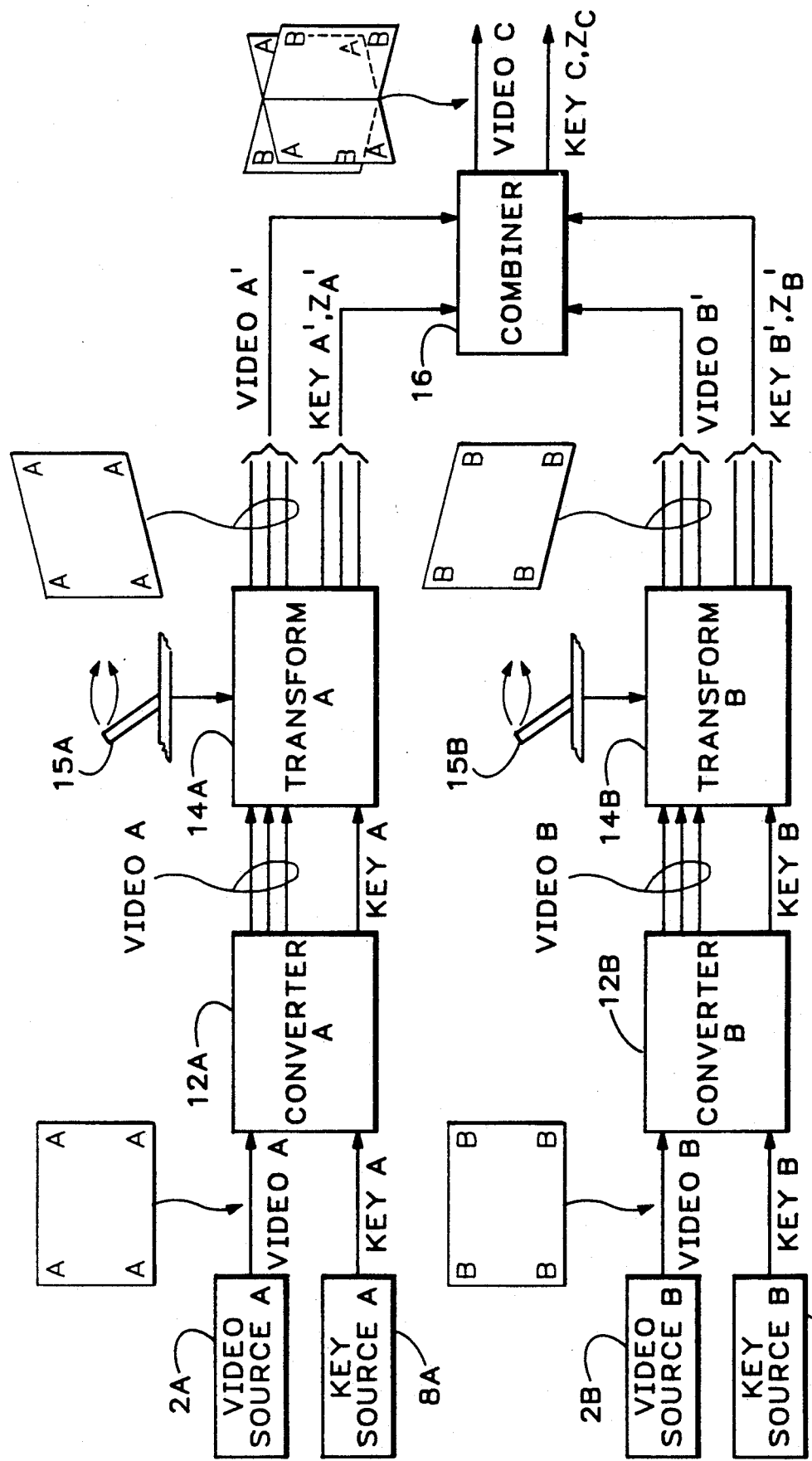
FIG. 1 is a block diagram of a conventional digital video effects system for combining two video images.
Figures 2, 4:
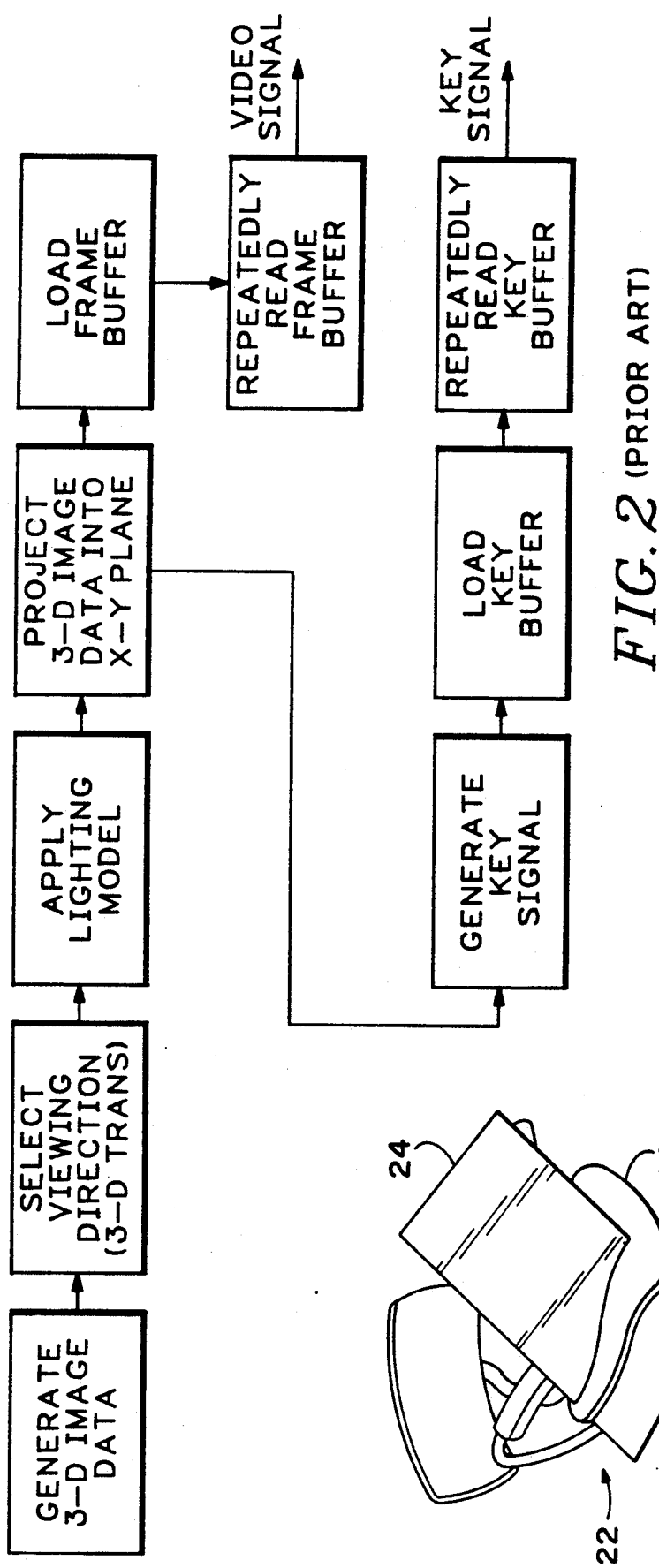
FIG. 2 is a high level flowchart illustrating operation of a graphics generator.
FIG. 4 is a representative display image resulting from use of the video effects system shown in FIG. 3.
Figure 3:
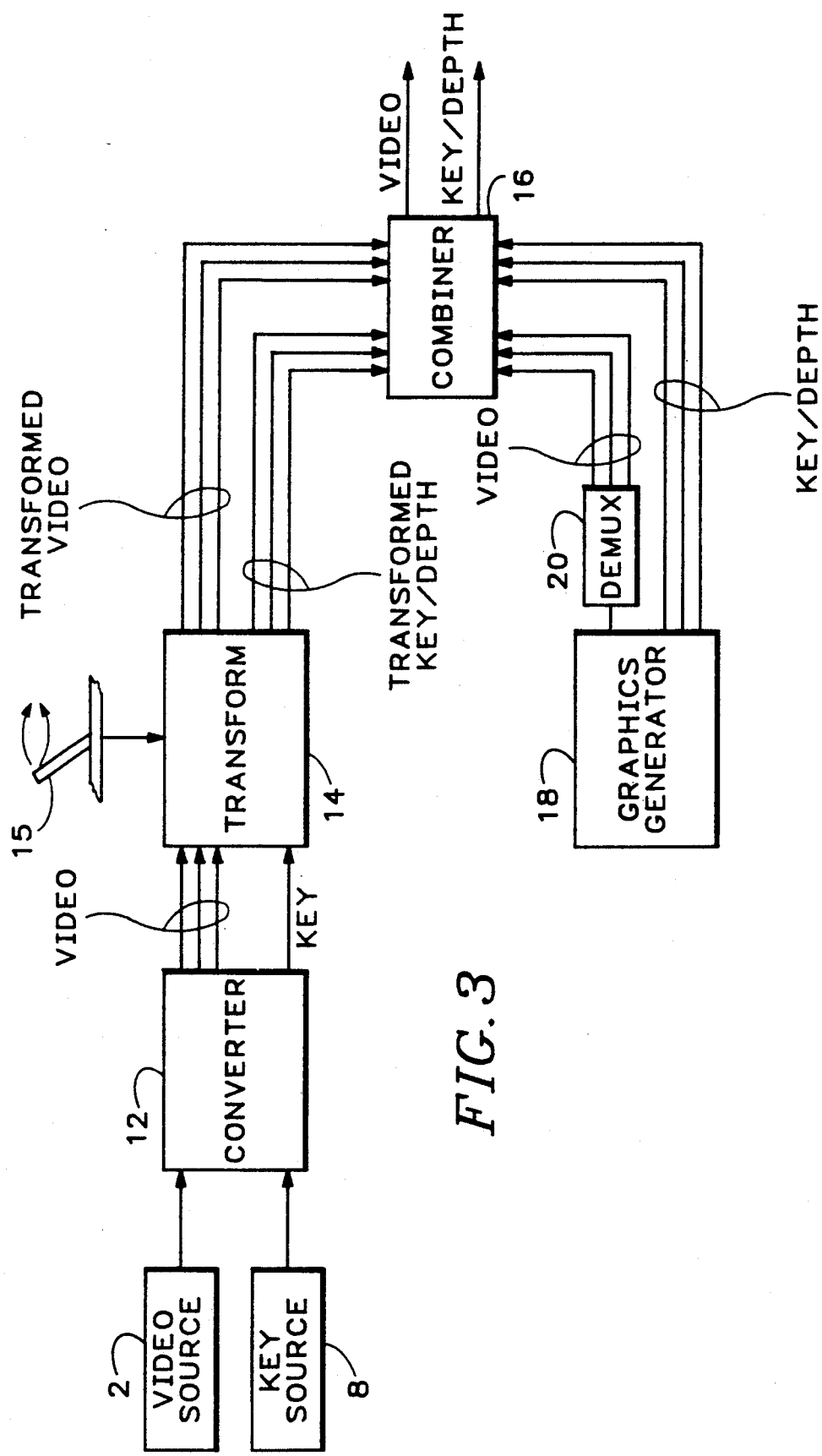
FIG. 3 is a block diagram of a video effects system embodying the present invention.

FIG. 3 illustrates apparatus similar to that shown in FIG. 1 but in which one video source and associated components have been replaced with a graphics generator 18 that operates in a manner similar to that described with reference to FIG. 2. The graphics generator 18 outputs a video signal representing the distribution of color information over a two-dimensional field. This video signal is generated in the manner previously described, by manipulating information relating to the locations in three-dimensional space of surface patches of a three-dimensional object, and is output in CCIR.601 form over a first output channel. The 4:2:2 video signal from graphics generator 18 is applied to a demultiplexer 20, which demultiplexes it into a luminance channel and two chroma channels. The graphics generator also has a second output channel, which carries a key signal. Further, the Z values calculated by the graphics generator are used to generate a twenty-bit depth signal. Since a surface patch would in general cover more than one pixel, values of Z for pixels within the boundary of the patch are calculated from the Z values for the vertices of the patch. These calculations are simplified by the fact that each patch is assumed to be planar. Each twenty-bit Z word is divided into two parts which are carried by two further output channels respectively. The key/depth signals provided by the graphics generator are therefore in the same format as the key/depth signals provided by transform section 14. The demultiplexed video signal provided by demultiplexer 20 and the key and depth signals provided by graphics generator 18 are then combined with the output signals of the transform section 14, in similar manner to that described with reference to FIG. 1, by use of depth combiner 16. Combiner 16 produces an output video signal representing an output image 22, such as shown in FIG. 4, which is a two-dimensional depiction of the intersection of a two-dimensional image 24 with a three-dimensional image 26.

By use of the joystick 15 associated with transform section 14, the two-dimensional image can be displaced and rotated in real time within the three-dimensional space occupied by the three-dimensional image and will always slice the three-dimensional image correctly when the two images intersect.

The system shown in FIG. 3 therefore provides a combined 3-D/2-D video effect by generating a 3-D image in slow time in a graphics generator, and then outputting the 3-D image in real time together with associated depth information to a digital video effects device for combining with another image to produce an intersection of a solid object with another image.

The 3-D image provided by graphics generator 18 may be a still image, or it may be an image in which movement is simulated by reading out a succession of images in real time.

It will be appreciated that the invention is not restricted to the particular embodiment that has been described, and that variations may be made therein without departing from the scope of the invention as defined in the appended claims and equivalents thereof. For example, if both inputs to the combiner were provided by graphics generators, then the resulting output image would represent the intersection of two three-dimensional images.

I claim:

1. A video effects system comprising:
   means for generating a three-dimensional image in simulated real time,
   means for generating a second image,
   transform means for transforming the second image in real time, and
   combiner means for combining the three-dimensional image with the transformed second image to produce an output image that is the intersection of the three-dimensional image and the transformed second image.

2. A video effects system according to claim 1, wherein the means for generating the three-dimensional image comprise means for generating an image of a three-dimensional object and providing a first video signal representative of the three-dimensional image projected into a display plane and a first depth signal representative of depth relative to the display plane, the means for generating the second image comprise means for generating a two-dimensional image in real time, the transform means comprise means for generating in real time a second video signal representative of the transformed second image projected into the display plane and a second depth signal representative of depth of the transformed second image relative to the display plane, and the combiner means are operative to combine the first and second video signals on the basis of the first and second depth signals.

3. A video effects system according to claim 1, comprising user interface means for selectively altering in real time the transformation effected by the transform means.

4. A video effects system: according to claim 1, wherein the means for generating the second image generates the second image in real time, the transform means generates depth information associated with the transformed second image, and the combiner means combines the three-dimensional image with the transformed second image on the basis of the depth information to produce the output image.

5. A video effects system according to claim 4, wherein the means for generating the second image comprise means for generating a video signal representative of a two-dimensional image, and the transform means comprise means for generating a second video signal representative of the transformed two-dimensional image projected into a display plane and generating a depth signal representative of depth of the transformed two-dimensional image relative to the display plane.

6. A video effects system according to claim 4, wherein the means for generating the three-dimensional image comprise means for generating an image of a three-dimensional object and providing a video signal representative of the three-dimensional image projected into a display plane and a depth signal representative of depth of the three-dimensional image relative to a display plane.

7. A video effects system according to claim 4, comprising user interface means for selectively altering in real time the transformation effected by the transform means.

8. A method for carrying out a video effect, comprising:
   generating in real simulated time a first video signal representative of a three-dimensional image and a first depth signal associated therewith,
   generating in real time a second video signal representative of a two-dimensional image,
   transforming the second video signal in real time and generating a second depth signal, and combining the first video signal with the transformed second video signal on the basis of the first and second depth signals.

9. A method accord to claim 8, wherein the three-dimensional image is a still image.

10. A video effects system, comprising:
    means for generating a three-dimensional still image;
    means for generating a second image in real time;
    transform means for transforming the second image in real time; and
    combiner means for combining the three-dimensional still image with the transformed second image to produce an output image that is the intersection of the three-dimensional still image and the transformed second image.

11. A video effects system according to claim 10, wherein the means for generating the three-dimensional still image comprise means for providing a first video signal representative of the three-dimensional still image projected into a display plane and a first depth signal representative of depth of the three-dimensional still image relative to the display plane, the transform means comprise means for generating in real time a second video signal representative of the transformed second image projected into the display plane and a second depth signal representative of depth of the transformed second image relative to the display plane, and the combiner means are operative to combine the first and second video signals on the basis of the first and second depth signals.

12. A video effects system according to claim 10, comprising user interface means for selectively altering in real time the transformation effected by the transform means.

13. A video effects system according to claim 10, wherein the transform means generate depth information associated with the transformed second image, and the combiner means combine the three-dimensional still image with the transformed second image on the basis of the depth information to produce the output image.

14. A video effects system according to claim 13, wherein the means for generating the second image comprise means for generating a video signal representative of a two-dimensional image, and the transform means comprise means for generating a second video signal representative of the transformed two-dimensional image projected into a display plane and generating a depth signal representative of depth of the transformed two-dimensional image relative to the display plane.

15. A video effects system according to claim 13, wherein the means for generating the three-dimensional still image comprise means for generating a still image of a three-dimensional object and providing a video signal representative of the three-dimensional still image projected into a display plane and a depth signal representative of depth of the three-dimensional still image relative to a display plane.

16. A video effects system according to claim 13 comprising user interface means for selectively altering in real time the transformation effected by the transform means.

* * * * *